United States Patent [19]

Schwabe et al.

[11] Patent Number: 5,077,335

[45] Date of Patent: Dec. 31, 1991

[54] OPTICALLY CLEAR SILICONE COMPOSITIONS

[75] Inventors: Peter Schwabe; Reiner Voigt, both of Leverkusen; Ottfried Schlak, Colonge; Otto-Christian Geyer, Braunfels, all of Fed. Rep. of Germany

[73] Assignee: Bayer Aktiengesellschaft, Leverkusen, Fed. Rep. of Germany

[21] Appl. No.: 442,824

[22] Filed: Nov. 29, 1989

[30] Foreign Application Priority Data

Dec. 23, 1988 [DE] Fed. Rep. of Germany ....... 3843411

[51] Int. Cl.$^5$ .............................................. C08K 5/01
[52] U.S. Cl. .................................. 524/474; 523/107;
525/478; 351/160 R; 351/160 H; 623/6;
524/490; 264/1.1; 264/2.6; 264/331.11; 528/15
[58] Field of Search ....................... 523/107; 525/478;
351/160; 623/6; 524/490, 474; 264/331.11, 1.1, 2.6

[56] References Cited

U.S. PATENT DOCUMENTS

| | | | |
|---|---|---|---|
| 4,774,297 | 9/1988 | Murakami et al. | 525/478 |
| 4,882,398 | 11/1989 | Mbah | 525/428 |
| 4,988,779 | 1/1991 | Medford et al. | 525/478 |

FOREIGN PATENT DOCUMENTS

0158459 10/1985 European Pat. Off. .
1188058 4/1970 United Kingdom .

*Primary Examiner*—Melvyn I. Marquis
*Attorney, Agent, or Firm*—Sprung Horn Kramer & Woods

[57] ABSTRACT

The present invention relates to optically clear polysiloxane-based compositions which are employed, in particular, for the production of contact optical articles such as contact lenses, scleral lenses and intraocular lenses.

9 Claims, No Drawings

OPTICALLY CLEAR SILICONE COMPOSITIONS

The present invention relates to optically clear polysiloxane-based compositions which are employed, in particular, for the manufacture of contact optical articles such as contact lenses, scleral lenses and intraocular lenses.

The spectrum of synthetics employed in contact optics has expanded year by year. Contact lenses have been developed from a very wide variety of materials, for example from PPMA, CAB (cellulose acetate butyrate), copolymers of vinylpyrrolidone etc.

Improvements in the material composition, associated with new lens shapes have been exceptionally beneficial for the use of contact lenses world-wide. In the particular case of lenses with a high water content, optimal gas permeability associated with good fluid exchange has been achieved. The lenses are distinguished by outstanding subjective tolerability. However, for all contact lenses with a relatively high water content it is also necessary to accept disadvantages such as deposition and infiltration of constituents of the tear film, especially of proteins, with possible allergic reactions. In addition, hypersensitivity reactions cannot be ruled out with certain preservatives in the cleansing, wetting and storage solutions.

The highly hydrophilic lens is inferior in optical quality to the hard lens.

It was obvious to look for a soft synthetic whose optical properties correspond to those of hard lenses, for a material which proves to be inert to lacrimal fluid, bacteria and viruses and, moreover, exhibits good physiological tolerability and has a high gas diffusion.

The surface wetting of the hydrophobic silicone rubber material which is necessary for good ocular tolerability was achieved by modifying the molecular structure of the lens surface (for example high-energy radiation or vacuum electron bombardment). Silicone lenses have intrinsically been known for a long time but it soon emerged that, for example, the surface wetting is maintained to only a very limited extent. In addition, other properties of the silicone lenses require improvement.

The present invention now relates to certain addition-crosslinked vinylsilicone mixtures for the manufacture of contact optical articles, in particular of contact lenses, scleral lenses and intraocular lenses. This takes the form of a cold-vulcanizing two-component silicone rubber system in which the basic mixture containing crosslinker is mixed with a catalyst mixture and crosslinked at room temperature or, when the pot life is adjusted to be particularly long, by a thermal impulse (of the order of about 50°-150° C.).

Two-component silicone rubber systems which crosslink on the basis of polydimethylsiloxanes which contain vinyl and SiH groups by addition reaction have been known for many years and are used, for example, as impression and duplicating compositions in dentistry.

These compositions consist of a basic component containing silicone polymer and crosslinker and of a catalyst component composed of silicone polymer, catalyst and inhibitor. The silicone polymer chiefly takes the form of a vinyl-endblocked polydimethylsiloxane, the crosslinker contains reactive SiH groups and the catalyst consists of platinum or a platinum complex. The basic and catalyst components can be adjusted to the same viscosity by specific allotment of silicone polymers with different viscosities. These two components are to be mixed in a defined ratio by weight or volume before use.

The starting substances, such as vinyl-containing silicone polymers, trimethylsiloxy-endblocked polydimethylsiloxanes and polysiloxanes containing SiH groups (crosslinker substances) are prepared in a manner known per se (compare, for example, W. Noll, Chemie und Technologie der Silikone (Silicone Chemistry and Technology), Verlag Chemie, Weinheim, 2nd edition 1964, pages 162-206).

Silicone polymers which have a low oligomer content due to vacuum baking in a thin-film or falling film vaporizer are described in DE-A 3,532,686.

The vinyl-containing silicone polymers generally take the form of vinyl-endblocked polydimethylsiloxanes, that is to say linear polymers. It is likewise possible for the crosslinkers containing SiH groups to be linear. Branches, that is to say a network, are obtained on crosslinking by means of a platinum catalyst if the crosslinker has SiH groups not only terminally but also in the chain. However, the closeness of the mesh of the network is limited in this case, because it is sensible and necessary for the density of SiH groups to remain limited. When the content of vicinal SiH groups in the crosslinker molecule is high, many of these SiH groups are unable to react with the vinyl groups as a result of steric hindrance. Instead of the hoped-for improvement in the elastomeric properties, exactly the opposite is achieved, namely insufficient crosslinking and a plasticizer effect.

Thus, it was desirable to improve the mechanical properties of the materials disclosed in DE-A 3,532,686. Surprisingly, it has now been found that the mechanical properties of these materials, such as hardness, tear strength and elongation at break, are distinctly improved, without this diminishing their optical properties, by addition of 1-10% by weight, preferably 1.5-5% by weight, of low molecular weight QM resins containing vinyl groups.

In addition, the addition of QM resins offers the further advantage that it is possible thereby to alter the refractive index of optically clear silicone compositions.

These QM resins are characterized in that they contain, as explained in the abovementioned book by W. Noll, page 3, the tetrafunctional $SiO_{4/2}$ as Q units and the monofunctional $R_3SiO_{\frac{1}{2}}$ as M building blocks, where R can be vinyl, methyl, ethyl or phenyl. In addition, it is also possible for the trifunctional $RSiO_{3/2}$ to be present as T units and the bifunctional $R_2SiO_{2/2}$ to be present as D units, with the same meaning for R as above. The content, according to the invention, of 1-10% by weight of QM resin, preferably 1.5-5% by weight of QM resin, in the total silicone system brings about a distinct improvement in the density of crosslinking and thus a higher tear strength and hardness of the elastomeric product.

The present invention relates to optically clear silicone compositions which can be cured to elastomers and contain a) organopolysiloxanes with two or more vinyl groups in the molecule, b) optionally organopolysiloxanes without reactive groups, c) organopolysiloxanes with two or more SiH groups in the molecule, d) catalyst, e) inhibitor, and optionally further customary additives and auxiliaries, characterized in that
the mixtures specified above additionally contain a low molecular weight QM resin which contains vinyl and ethoxy groups and is homogeneously soluble in a) and which, firstly, has a vinyl group content of 0.5–8 mmol/g, secondly consists of $SiO_{4/2}$, $RO_{\frac{1}{2}}$ and $R_3SiO_{\frac{1}{2}}$ units, and R represents a methyl, vinyl, phenyl and ethyl group and has an ethoxy group content of less than 4 mmol/g and, thirdly, is present in the final product to the extent of 1–10% by weight, preferably 1.5–5% by weight,
the catalyst content—calculated as metal—is less than 5 ppm, preferably less than 3 ppm, (based on the total mixture),
the SiH group content is from 0.05 to 0.8 mmol/g (based on the total mixture),
organopolysiloxanes containing 0.5 to 11.6 mmol vinyl/g are employed as inhibitors,
the specific gravity of the curable compositions is less than 1.0 and
the compositions optionally contain an additional 0–30% by weight of branched, saturated C15–C50 hydrocarbons, preferably isoparaffins.

The starting materials employed for the subject of the invention are materials which are known per se and as are customary in silicone technology.

The vinyl-endblocked polydimethylsiloxanes have a viscosity of about 200–100,000 mPa.s (20°), and the SiH-containing polysiloxanes have an SiH content of 0.1–10 mmol/g and a viscosity of about 50–500 mPa.s (at 20° C.). The QM resins employed according to the invention are known per se. The preparation thereof is described, for example, in U.S. Pat. Nos. 2,676,182, 2,857,356 and 3,527,659.

It is essential for the use according to the invention that
the QM resins have such low molecular weights that they form optically clear solutions in the vinyl-endblocked polydimethylsiloxanes, and blends thereof result in optically clear final products. As a rule, QM resins of this type have a viscosity of 150 to 1,500 mPa.s;
the SiOH content of the QM resins is so low that no optical disturbances due to bubbles of released hydrogen gas can arise;
the content of volatile and/or unreactive molecules is so low that the dimensional stability of the shaped articles is not diminished; and the QM resins have a vinyl content of 0.5 to 8 mmol/g and an ethoxy content of 0.2 to 3 mmol/g.

The content of volatile oligomers, measured as described in DE-A 3,532,686, should not exceed 0.8% by weight.

The ratio of the total of $R_3SiO_{\frac{1}{2}}$ and $EtO_{\frac{1}{2}}$ units to the $SiO_{4/2}$ units ought, in this connection, to be below 2.5, and the lower limit is determined by the optically clear solubility of the QM resins in the vinyl-endblocked polydimethylsiloxanes and by the optical clarity of the final products.

The QM resins can, in addition, contain small proportions of $R_2SiO$ and $RSiO_{3/2}$ units without this interfering with the use according to the invention, but the total of $R_2SiO$ and $RSiO_{3/2}$ units ought not to exceed 20 mol-%.

A preferred QM resin has the formula

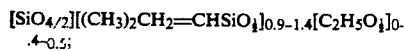

has a vinyl content of 5.5–6.5 mmol/g and a viscosity of 500–800 mPa.s at 23° C.

The trimethylsilyl-endblocked siloxanes have viscosities of about 100–1,000 mPa.s (at 20° C.).

The polysiloxanes to be used are freed of oligomers as described in DE-A 3,532,686 and have an oligomer content of <0.8% by weight.

Employed as catalysts are customary Pt compounds or complexes such as, for example, hexachloroplatinic acid or Pt complexes with vinylsiloxanes.

The compositions and the lenses are produced in a manner known per se, and the processing to contact lenses can be carried out, for example, with the aid of spin cast processes or by pouring into molds and subsequent curing.

Intraocular use of the material according to the invention is also possible. For this, the composition can, in a straightforward manner, be introduced while still fluid into the interior of the eye and it then cures.

The subject of the invention is now to be explained in more detail by means of the examples which follow (unless otherwise noted, parts are parts by weight).

EXAMPLE 1

(According to the Invention)

A basic component is prepared by mixing in a mixer 7 parts of vinyl-endblocked polydimethylsiloxane with a viscosity of 1,000 mPa.s (a), 10 parts of vinyl-endblocked polydimethylsiloxane with a viscosity of 10,000 mPa.s (b), 11 parts of vinyl-endblocked polydimethylsiloxane with a viscosity of 50,000 mPa.s (c) and 12 parts of polydimethylsiloxane which contains SiH groups and has a viscosity of 200 mPa.s and 2.5 mmol SiH/g.

A catalyst component is prepared in a mixer by mixing 19 parts of (a), 10 parts of (b), 9 parts of (c), 2 parts of QM resin of the formula

with a viscosity of 800 mPa.s, 0.02 parts of a complex of platinum and tetramethyldivinyldisiloxane as catalyst and 0.05 parts of tetravinyltetramethyltetrasiloxane as inhibitor.

When the basic component is mixed with the catalyst component in the ratio 1:1 by weight the resulting SiH:-SiVi ratio is 1.77:1.

EXAMPLE 2

(Comparison)

A basic component is prepared by mixing in a mixer 11.2 parts of (a), 10 parts of (b), 10 parts of (c) and 3.5 parts of polysiloxane containing SiH groups from Example 1.

A catalyst component is prepared in a mixer from 14.8 parts of (a), 10 parts of (b), 10 parts of (c), 0.02 parts of platinum catalyst from Example 1 and 0.05 parts of inhibitor from Example 1.

When the basic component is mixed with the catalyst component in the ratio 1:1 by weight the resulting SiH:-SiVi ratio is 1.74:1.

EXAMPLE 3

(Comparison from DE-A 3,532,686)

A basic component is prepared by mixing in a mixer 35 parts of vinyl-endblocked polydimethysiloxane with a viscosity of 65,000 mPa.s, 30 parts of vinyl-endblocked polydimethylsiloxane with a viscosity of 1,000 mPa.s and 35 parts of polydimethylsiloxane which contains SiH groups and has a viscosity of 95 mPa.s and 1.0 mmol SiH/g.

The catalyst component is prepared by mixing in a mixer 35 parts of vinyl-endblocked polydimethylsiloxane with a viscosity of 65,000 mPa.s, 65 parts of vinyl-endblocked polydimethylsiloxane with a viscosity of 1,000 mPa.s, 0.2 parts of a platinum/siloxane complex and 0.05 parts of tetravinyltetramethyldisiloxane.

When the basic component is mixed with the catalyst component in the ratio 1:1 by weight the resulting SiH:SiVi ratio is 2.33:1.

EXAMPLE 4

The basic components were mixed with the particular-catalyst component in the ratio 1:1 by weight under vacuum. The mixtures were poured bubble-free into moulds with the negative of a DIN 53 504 test piece and into moulds with a diameter of 1 cm and a depth of 1 cm and crosslinked at 120° C. for 30 minutes. The Shore A hardness of the round test specimens was measured, and, based on DIN 53 504, the tear strength in N/mm$^2$ and the elongation at break in % were measured on the test pieces.

| Example | Shore A | Tear strength [N/mm$^2$] | Elongation at break [%] |
|---------|---------|--------------------------|-------------------------|
| 1 | 29 | 1.9 | 200 |
| 2 | 19 | 0.5 | 180 |
| 3 | 17 | 0.4 | 170 |

The contact lenses produced from these materials comply with the requirements on the radial stability (according to DIN 58224), display an excellent biological compatibility and have a very good weight constancy.

What is claimed is:

1. In an optically clear silicone composition which can be cured to an elastomer comprising
    a) an organopolysiloxane with two or more vinyl groups in the molecule,
    b) optionally an organopolysiloxane without reactive groups,
    c) an organopolysiloxane with two or more SiH groups in the molecule,
    d) a catalyst containing Pt metal or Pt metal complexes, and
    e) an inhibitor,
wherein the improvement comprises
    the silicone composition additionally contains a low molecular weight tetrafunctional SiO$_{4/2}$—and monofunctional R$_3$SiO$_{\frac{1}{2}}$—containing resin which contains vinyl and ethoxy groups and is homogeneously soluble in a) and which resin, firstly, has a vinyl group content of 0.5–8 mmol/g, secondly, consists of SiO$_{4/2}$, RO$_{\frac{1}{2}}$ and R$_3$SiO$_{\frac{1}{2}}$ units, where R represents a methyl, vinyl, phenyl or ethyl group, and has an ethoxy group content of less than 4 mmol/g and, thirdly, is present in the silicone composition to the extent of 1–10% by weight,
    the catalyst content—calculated as metal—is less than 5 ppm based on the total mixture,
    the SiH group content is from 0.05 to 0.8 mmol/g based on the total mixture,
    the inhibitor is an organopolysiloxane containing 0.5 to 11.6 mmol vinyl/g,
    the specific gravity of the curable silicone composition is less than 1.0, and
    the silicone composition optionally additionally contains branched saturated hydrocarbons with 15–50 C atoms.

2. Composition according to claim 1, containing 1.5–5% by weight of the tetrafunctional SiO$_{4/2}$—and monofunctional R$_3$SiO$_{\frac{1}{2}}$—containing resin.

3. Composition according to claim 1, wherein the SiH content is 0.1–0.5 mmol/g.

4. Contact optical article produced from composition according to claim 1.

5. Contact lens produced from compositions according to claim 1.

6. Scleral lens produced from compositions according to claim 1.

7. Intraocular lens produced from compositions according to claim 1.

8. A process for the production of a contact optical article, comprising introducing a composition according to claim 1 into a mold, and curing the composition at temperatures of 20° C. to 150°.

9. A process according to claim 8, further comprising subjecting the cured composition to an after treatment.

* * * * *